United States Patent Office 3,207,169
Patented Sept. 21, 1965

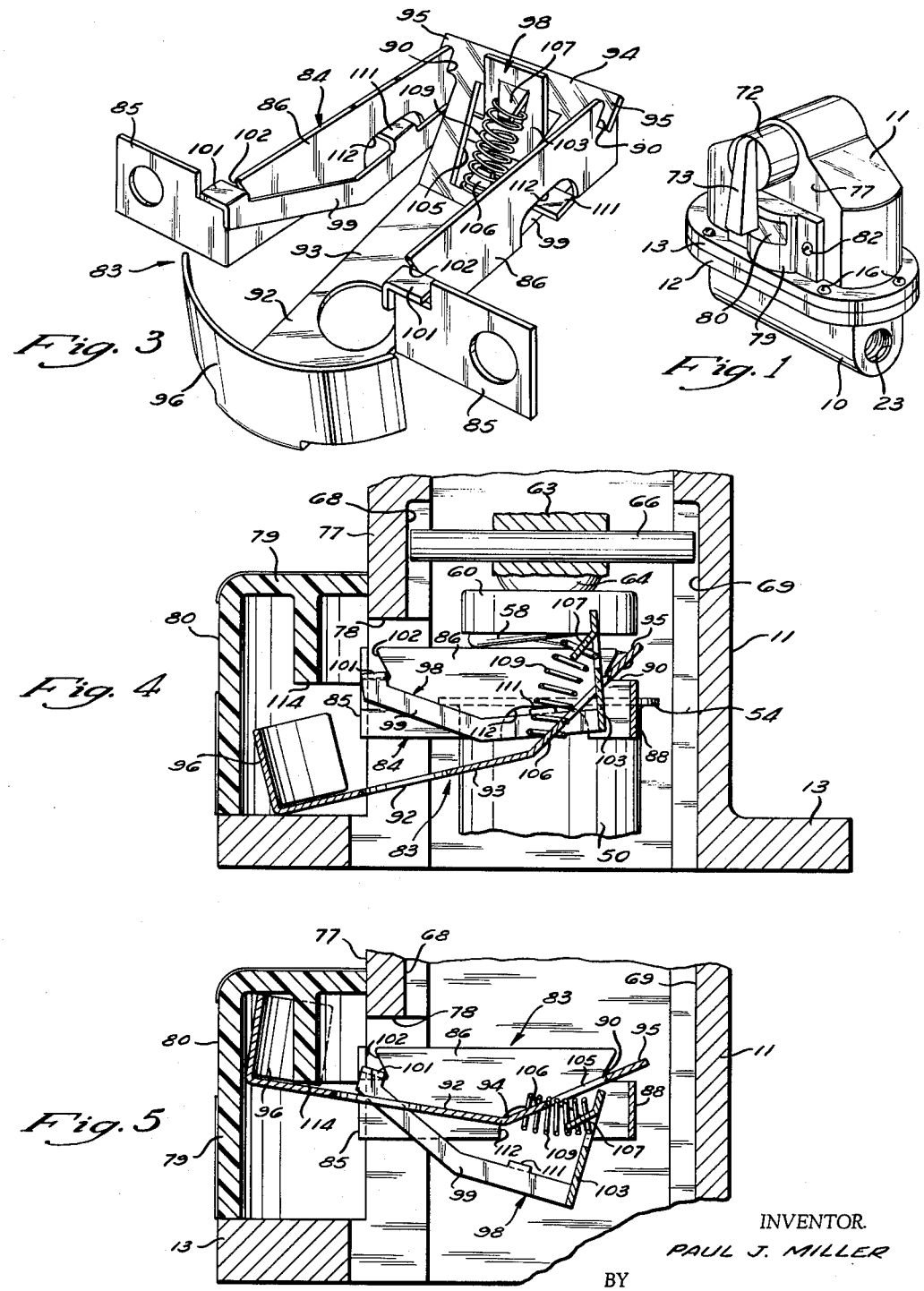

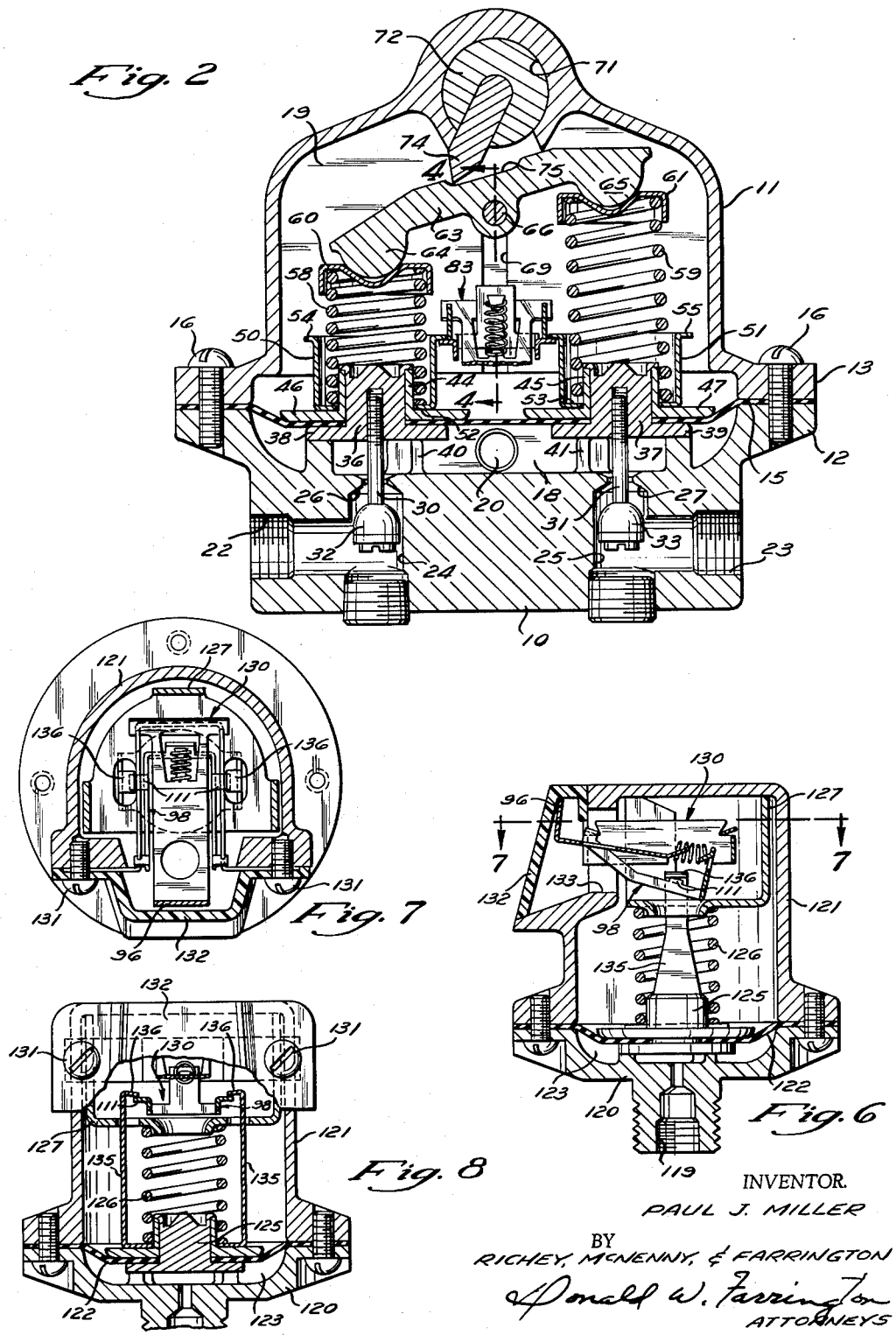

3,207,169
SNAP ACTION INDICATOR FOR
CHANGEOVER VALVES
Paul J. Miller, Maple Heights, Ohio, assignor to The
Weatherhead Company, Cleveland, Ohio, a corporation
of Ohio
Filed Nov. 23, 1962, Ser. No. 239,598
6 Claims. (Cl. 137—113)

This invention relates generally to indicator devices and more particularly to indicator devices having a snap action to positively move a signal flag or marker between two positions in response to movement of an actuating member.

This invention has particular application to systems for providing a continuous flow of liquified petroleum gas from multiple supply tanks to a single outlet. These systems employ automatic changeover pressure regulator valves which are operable in response to pressure in the individual tanks whereby depletion of one supply tank and the consequent lowering of gas pressure causes the changeover regulator valve to automatically connect the load to another tank which thereafter delivers gas at a reduced pressure level. The difference in the delivered pressure load causes activation of a visual indicator signal to show that one tank is depleted and should be replaced to maintain a continuous source of gas. A manually operated selector device is provided to allow changing the bias on the regulator valves to determine the outlet pressure level and the cylinder from which gas is drawn. It is also desirable that the indicator be operable so that by activation of the manual selector device to connect any one of the tanks to the outlet, the pressure level within that tank will be registered by the indicator. Therefore, the indicator should be responsive only to the condition of the selected tank and only if the selected tank is exhausted to a point where the pressure within the tank has dropped below a predetermined level.

It is, therefore, a principal object of this invention to provide a novel indicator device having a snap action indicating member which is movable in an abrupt manner between two positions without intermediate stable positions in response to the movement of a continuously movable actuating member, in which the actuating member is not moved to an overcenter position so that it may be returned to the original position and cause a reversal of movement of the indicating member by the removal of the biasing force which is applied in only one direction to the actuating member.

It is another object of this invention to provide an indicator device as set forth in the preceding object in which the snap action movement of the indicator member in both directions takes place at substantially the same position in the range of movement of the actuating member.

It is another object of this invention to provide an indicator device of the type set forth in the preceding objects which is operable by a minimum applied force to the actuating member to insure positive action of the indicator device while providing a minimum of biasing force by the actuating member to the device to which the unit is operable connected.

It is another object of this invention to provide an indicator device to the type set forth in the preceding objects in which the movement of the actuating member may be accomplished by several separate devices so as to allow the indicator device to be responsive to a given condition occurring in either of the separate devices controlling the indicator.

It is another object of this invention to provide a changeover valve to selectively connect one of several sources of gas under high pressure to a single outlet in which an indicator device is provided having a signal flag movable to a position to indicate a condition of exhaustion on the supply tank to which the selective valve has connected to the outlet independently of the condition of the other tanks.

It is still another object of this invention to provide a device of the type set forth in the preceding objects which is of simple and low cost construction while providing for long life and dependable operation.

Further objects and advantages of this invention will readily become apparent to those skilled in the art upon a more complete understanding of the invention as shown in the drawings and described in the following detailed description.

In the drawings:

FIGURE 1 is a perspective view of a changeover regulator valve incorporating the present invention;

FIGURE 2 is a vertical cross-sectional view through the valve of FIGURE 1 showing the valve in the position when both supply tanks are empty or disconnected;

FIGURE 3 is a perspective view of the indicator device employed in the valve of FIGURES 1 and 2;

FIGURE 4 is a fragmentary cross-sectional view of the indicator device taken along the line 4—4 of FIGURE 2 with the flag in the lowered position;

FIGURE 5 is a cross-sectional view similar to FIGURE 4, but with parts removed and showing the indicator device with the flag in the raised position;

FIGURE 6 is a vertical cross-sectional view through a pressure responsive indicator incorporating the indicator device shown in FIGURE 3;

FIGURE 7 is a cross-sectional view taken along line 7—7 of FIGURE 6; and

FIGURE 8 is a front elevational view with parts broken away of the device of FIGURES 6 and 7.

Referring now to the figures in greater detail, the changeover regulator valve shown in FIGURES 1 and 2 has a lower body member 10 and an upper housing 11 which have mating flanges 12 and 13, respectively, which clamp a flexible diaphragm 15 between them and are held together by screws 16. The diaphragm 15 extends completely across the interior to separate it into a gas chamber portion 18 between the diaphragm and the body 10, and an air chamber 19 on the other side of the diaphragm 15 within the upper housing 11. A gas outlet 20 is provided on body 10 from the gas chamber 18 for connection to line to be supplied by the cylinders.

The body 10 is provided with left and right inlets 22 and 23 which are each connected by means of suitable fittings and piping to separate gas cylinders. The inlets 22 and 23 open into bores 24 and 25 which terminate at the upper end in valve seats 26 and 27 adjacent the gas chamber 18. Valve stems 30 and 31 extend through the seats 26 and 27 and carry on their lower ends poppets 32 and 33, which by their movement to and from the valve seats 26 and 27 control the flow of gas from the gas cylinders into the chamber 18. At their upper end, the stems 30 and 31 are secured in plungers 36 and 37 which extend through and make sealing contact with the flexible diaphragm 15. The plungers 36 and 37 have radial flanges 38 and 39 on their lower ends which are adapted to engage projecting stops 40 and 41 on the body portion 10 to limit downward movement of the plungers and hence the valve stems and poppets.

In order to secure the plungers 36 and 37 to the diaphragm 15, retainers 44 and 45 are placed on the upper side of diaphragm 15 and secured to the plungers 36 and 37 by spinning or peening at the upper end. The retainers 44 and 45 have flanges 46 and 47 at their lower ends which cooperate with flanges 38 and 39 to firmly clamp the diaphragm 15 therebetween. Cylindrical cups 50 and 51 are fitted around the plungers 36 and 37 in the air chamber 19 and on their lower ends are provided with inturned flanges 52 and 53 to provide spring seats. At the upper end of the cups 50 and 51 are outwardly projecting flanges 54 and 55 for actuating the indicator mechanism in the manner to be described in greater detail hereinafter.

The movement of the plungers 36 and 37 is controlled by springs 58 and 59 which are seated at their lower ends on flanges 52 and 53 of cups 50 and 51 and provided on their upper ends with caps 60 and 61. A rocker arm 63 is positioned within the chamber 19 to have one end 64 in contact with the left cap 60, and the other end 65 in contact with the right cap 61. Intermediate the ends 64 and 65, rocker arm 63 has a transverse pin 66, the projecting ends of which ride in vertical grooves 68 and 69 formed in the upper housing 11 to guide the rocker arm 63 for vertical movement. The upper housing 11 has a transverse bore 71 in its upper end in which is journaled a control shaft 72 having an external handle 73 as shown in FIGURE 1. Within the cover 11, the shaft 72 carries a downwardly projecting finger 74 which engages the top portion 75 of rocker arm 63. It will be seen that the finger 74 serves to selectively shift the pivot point of the rocker arm 63 so that the balance of force of the springs 58 and 59 causes one end of the rocker arm to be depressed and thereby increase the biasing force of the spring on the valve plunger. As shown in FIGURE 2, with the finger 74 adjacent the left end 64 of rocker arm 63, the left spring 58 is compressed to increase the biasing force on the left plunger 36 in opposition to the pressure in gas chamber 18 acting on the under side of diaphragm 15 tending to lift the poppet 32 into engagement with the valve seat 26 and prevent further flow of gas from the inlet 22 to the gas chamber 18.

Assuming both supply tanks are full and the rocker arm 63 is in the position of FIGURE 2, this construction provides a pressure regulating action so that when the pressure within the gas chamber 18, which is normally high enough to close both valves, drops below the level determined by the biasing force of the left spring 58, the spring forces the plunger 36 downward to open the valve and admit gas from the cylinder into the gas chamber 18. Because of the position of the rocker arm 63 applying a greater spring bias to the left spring 58, a pressure drop in the gas chamber 18 will cause the left hand valve plunger 36 to move downward before the right hand plunger 37.

The amount of movement of the plunger 36 to shift its poppet away from the valve seat is relatively slight and not sufficient to move the plunger 36 into the position shown in FIGURE 2 in which the flange 38 is in contact with the stop 40. Such a condition can take place only when the pressure in the associated gas cylinder has dropped to a level where the cylinder is exhausted. When this happens, the pressure in gas chamber 18 drops to a lower level where the right hand plunger 37 can move downward under the lower bias of its spring 59 to supply gas from its associated supply tank. This lower pressure level is insufficient to hold the left valve partially closed and plunger 36 together with cup 50 moves downward until flange 38 rests on the stop 40. Since this movement takes place only when the associated supply tank is exhausted, movement of the cups 50 and 51 may be used to actuate an indicator to indicate that the associated gas cylinder has been emptied.

The indicator assembly 83 is shown in greater detail in FIGURES 3–5. The front face 77 of the upper housing 11 is provided with an opening 78 which is covered by a cover 79. The cover 79 is preferably formed from a clear plastic material which is then coated to render it opaque except for a window portion 80 on the front side as shown in FIGURE 1. The cover 79 is secured to the upper housing 11 by means of screws 82. An indicator frame 84 which is generally U-shaped has a pair of projecting front tabs 85 which allow the frame 84 to be secured between the upper housing 11 and cover 79 by the screws 82 to clamp it rigidly in position. The frame 84 is formed from sheet metal and has parallel sides 86 which are joined together across their rear ends by a back wall 88. Adjacent the back wall 88, the sides 86 are provided with a pair of notches 90 at the upper edge. An indicator arm 92 is mounted between the parallel sides 86 of frame 84 to have a center section 93 and an angularly extending rear section 94 from the rear edge of which project a pair of ears 95 adapted to fit within the notches 90 to allow the indicator arm 92 to be pivotally mounted on frame 84. The front end of the center section 93 of the arm 92 carries an upstanding flag portion 96 which is adapted to move vertically and in its raised position be visible through the window 80 on the cover 79.

The position of the indicator arm 92 is controlled by an actuating member 98 which has a pair of parallel arms 99 adapted to fit within the sides 86 of frame 84. These arms 99 are provided with projecting ears 101 on their ends which fit within notches 102 on the front upper edge of the frame sides 86 to allow the actuating member 98 to pivot about this point. Adjacent the back wall 88 of frame 84, the actuating member 98 has a center wall section 103 extending transversely between the arms 99 and adapted to project upwardly through an opening 105 in the angularly extending rear section 94 of indicator arm 92. The indicator arm 92 is provided with a tab or tongue 106 projecting rearwardly into opening 105, and likewise the center section 103 of actuator arm 98 is provided with a projecting tab or tongue 107. These tabs or tongues 106 and 107 serve to position the ends of a coil compression spring 109 which provides the necessary biasing force to give a snap action to the movement of the indicator arm.

In order to operate the actuating member 98, the arms 99 are provided with outwardly projecting tabs 111 which lie within cutouts 112 on the frame sides 86 when the actuating member is in the upper position shown in FIGURE 4. These tabs 111 extend underneath the upper flanges 54 and 55 on the cups 50 and 51 so that downward movement of either cup will cause the actuating member 98 to be rotated downwardly. The pivot axes formed by the notches 90, the notches 102, as well as the tabs 106 and 107, provide a linkage to give a snap action to the movement of the indicator arm 92 in response to movement of the actuating member 98. The spring 109, when the indicator arm is in the lowered position shown in FIGURE 4, serves to bias the indicator 92 in a downwardly direction.

When either of the plungers 36 and 37 and their cups 50 and 51 moves downward in response to the exhausted condition of the associated supply tank, the upper flange 54 or 55 on the cup engages the upper side of the adjacent one of the ears 111 and moves the actuating member 98 in a downward direction. When the gas pressure in chamber 18 reaches a sufficiently low level that the other valve opens, the actuating member 98 and hence the tab 107 reach an over-center position with respect to the position of the tab 106 on the indicator arm and the notches 90, the spring 109 then exerts a biasing force tending to lift the indicator arm 92 and raise the flag portion 96 so that it is visible within the window 80. Since this is an over-center action, once the actuating member 98 has reached a position where the indicator arm 92 starts to move, the indicator arm will move positively and rapidly to the raised position. It should be noted that when the indicator arm moves to the raised position shown in FIGURE 5, the center portion 93 comes into contact with a projecting stop 114 formed in the cover 79 to limit further upward movement. This prevents the line of biasing force between tabs 106 and 107 from reaching an over-center position with respect to the notches 102 on which the actuating member 98 is pivoted. Thus, although the spring 109 now exerts an upward bias on the indicator arm 92, it also still exerts an upward bias on the actuating member 98 so that when the adjacent cup on the plunger is raised so that it no longer presses down on the projecting ear 111, the actuating member will rotate upward under the biasing force of spring 109 until it reaches a position where the indicator arm 92 can snap back to the downward position shown in FIGURE 4 where it rests on the lower edge of opening 78.

Returning now to the operation of the changeover valve shown in FIGURE 2, it will be recognized that both plungers 36 and 37 are in the downward position shown in FIGURE 2 only when both cylinders are empty and therefore the pressure within the gas chamber 18 is insufficient to raise the plunger 37 against the relatively light biasing force of its uncompressed spring 59. If the cylinder connected to the left inlet 22 were full and connected to the gas chamber 18, this pressure would cause the right plunger 37 to move upward to close this valve, and the left plunger 36 would also be raised until the poppet 32 is adjacent the valve seat 26. Since both cups will then be raised, the indicator will not be actuated and the flag 96 will not be visible through the window 80.

Assuming the right tank to be full, when the left tank is exhausted, the pressure in gas chamber 18 will then fall to a level where the decreased pressure force on the diaphragm will allow the right valve to come into operation to supply gas at the lower pressure level determined by the lower biasing force of the right valve spring 59. At this lower level, the baising force of the left spring 58 is sufficient to force the left plunger 36 and cup 50 downward to the wide open position where the upper cup flange 54 will pull the actuating member 98 downward to snap the indicator arms 92 into the raised position where the flag 96 is visible in window 80 to indicate that the left tank is exhausted. Of course, if under these conditions the right tank were empty, the pressure in gas chamber 18 would continue to fall and the indicator would be operated in the same way.

In the case where the rocker arm is in the position of FIGURE 2 with the left tank full and the right tank empty, if the control shaft 72 were rotated to shift the finger 74 to its other position on the top surface on the rocker arm 63 adjacent the right end 65, then the rocker arm 63 would rotate so that the right spring 59 would be compressed and the left spring 58 uncompressed. The decreased bias on left spring 58 would be such that the gas pressure in the gas chamber 18 would force the left valve poppet to the closed position where it would remain until the pressure in the gas chamber 18 drops to sufficiently low level to open this valve. However, the increased compression applied to the right spring 59 will cause the right plunger 37 to move downward as the pressure in chamber 18 drops until this valve is wide open so that the upper flange 55 of cup 51 will pull the actuating member 98 downward to the position where the indicator arm will snap to the raised position thereby indicating that the tank connected to the right inlet 23 is empty.

Thus, rotation of the control shaft 72, to select one of the tanks connected to the two inlets 22 and 23, will determine which one of the cups 50 and 51 operates the actuating member 98 to indicate whether that tank is empty or full depending upon whether or not the flag portion 96 appears in the window 80. If both tanks are full, the pressure level in gas chamber 18 will not drop to a lower level, and neither of the plungers will move to the downward position to cause the actuating member 98 to raise the flag 96. Likewise, if both tanks are empty, the failure of the pressure in chamber 18 to rise and lift the selected plunger will cause the flag 96 to remain in the raised position in both positions of the control shaft 72. Therefore, the appearance or non-appearance of the flag 96 in the window 80 indicates whether or not the selected tank is empty independently of the condition of the other tank.

The indicator employed in the changeover valve of FIGURES 1 and 2 may also be used in a line pressure indicator as shown in the pressure responsive indicator of FIGURES 6–8. In this device, a bottom housing 120 and a top housing 121 are clamped together with a diaphragm 122 between them. The bottom housing 120 has a fitting 119 connected to the line to admit pressure into the gas chamber 123 on the under side of diaphragm 122. A plunger assembly 125 is secured to diaphragm 122 and may be constructed in the same manner as the plungers in the changeover valves of FIGURES 1 and 2. This plunger assembly 125 is biased downwardly by a spring 126 whose upper end is anchored by a cage 127 secured in the top housing 121. The indicator assembly 130 is identical with the indicator assembly 83 and is held within the top housing 121 by the screws 131 which hold a window 132 in place over an opening 133 in the top housing 121. The plunger assembly 125 has a pair of upwardly extending arms 135 which have inwardly projecting hook portions 136 on the upper end to fit over the ears 111 on the actuating member 98. Thus, depending upon the biasing force of the spring 126, and the pressure within the gas chamber 123, the arms 135 and the hook portions 136 will move upwardly and downwardly to operate the indicator assembly 130 to raise and lower the flag portion 96 within the window 132 to indicate whether the line pressure is above or below the predetermined valve.

While the invention has been shown and described in detail to allow it to be practiced by those skilled in the art, it is recognized that such persons upon full understanding of the invention may resort to other modifications and rearrangements of the invention which may be resorted to without departing from the scope of the invention as defined in the following claims:

What is claimed is:

1. In a pressure responsive device comprising a housing, a member in said housing movable in response to pressure changes, a window in said housing, a frame in said housing adjacent said window, a visual indicator pivotally mounted on said frame and movable between a first position visible through said window and a second position away from said window, an actuating member pivotally mounted on said frame and movable in one direction by said pressure responsive member, overcenter spring means coupling said indicator and said actuating member to positively shift said indicator between said first position and said second position with a snap action responsive to different positions of said actuating member, stop means engageable by said indicator when said indicator is moved into said first position by movement of said actuating member by said pressure responsive member in said one direction, said overcenter spring means biasing said actuating member in the opposite direction when said indicator is in said first position to provide an automatic return for said indicator to said second position.

2. A pressure indicating device comprising a housing, a diaphragm in said housing defining a gas chamber and movable in response to pressure changes in said gas chamber, a plunger on said diaphragm movable therewith, spring means biasing said plunger in one direction, a frame in said housing adjacent said window, a visual indicator pivotally mounted on said frame and movable between a first position visible through said window and a second position away from said window, an actuating member pivotally mounted on said frame and movable in said one direction by said plunger, over-center spring means coupling said indicator and said actuating member to positively shift said indicator between said first position and said second position with a snap action responsive to different positions of said actuating member, stop means engageable by said indicator when said indicator is moved into said first position by movement of said actuating member by said pressure responsive member in said one direction, said over-center spring means biasing said actuating means in the opposite direction when said indicator is in said first and second positions to provide an automatic return for said indicator to said second position.

3. A changeover pressure regulator adapted to supply gas to a low pressure outlet from one of two high pressure inlets comprising a housing, a gas chamber in said housing, first and second valve means in said housing, each of said valve means connecting one of said inlets to said gas chamber, each of said valve means having spring means biasing said valve means to the open position, pressure responsive means operable by pressure in said gas chamber, said pressure responsive means being operatively connected to said valve means to bias said valve means to the closed position, control means adapted to selectively increase the biasing force of one of said spring means, a frame in said housing, a visual indicator pivotally mounted on said frame for movement between two positions, an actuating member pivotally mounted on said frame and movable by said valve means through a continuous range of movement, and over-center spring means coupling said indicator and said actuating member to positively shift said indicator between said two positions with a snap action resopnse to different positons of said actuating member, said over-center spring means biasing said actuating member in same direction in both said positions to provide an automatic return for said indicator.

4. A changeover pressure regulator adapted to supply gas to a low pressure outlet from one of two high pressure inlets comprising a housing, a diaphragm in said housing extending across the interior thereof to form a gas chamber, first and second valve means in said housing, each of said valve means connecting one of said inlets to said gas chamber, each of said valve means having spring means biasing said valve means to the open position, each of said valve means being operatively connected to said diaphragm to permit the pressure in said gas chamber to bias the valve means to the closed position, control means adapted to selectively increase the biasing force of one of said spring means, a window in said housing, a frame in said housing adjacent said window, a visual indicator pivotally mounted on said frame for movement between a first position in which said indicator is visible through said window and a second position away from said window, an actuating member pivotally mounted on said frame and movable by said valve means in one direction toward said diaphragm, over-center spring means coupling said indicator and said actuating member to positively shift said indicator between said first and second positions with a snap action responsive to different positions of said actuating member, and stop means engageable by said indicator in said first position in response to movement of said actuating member toward said diaphragm, said over-center spring means biasing said actuating member away from said diaphragm when said indicator is in both said first and said second positions to provide an automatic return for said indicator.

5. An indicator comprising a generally U-shaped frame having parallel side walls, an end wall extending across said side walls at one end of said frame, a first pair of pivot notches on opposed portions of said frame side walls adjacent said end wall, a second pair of pivot notches on opposed portions of said frame side walls away from said end wall portion, an indicator member having projecting ears pivotally mounted on said first pair of pivot notches for swinging movement between first and second positions, and actuating member having projecting ears pivotally mounted on said second pair of pivot notches, said indicator member having a portion extending between said frame side walls beyond said second pair of pivot notches, an opening in said indicator member adjacent said projecting ears, said actuating member having a projecting portion extending into said opening, said opening having a projecting tab on the side away from said projecting ears, a projecting tab on the projecting portion of said actuating member, a coil spring extending between said tabs to bias them away from each other, said first and second pairs of pivot notches and said first and second tabs being arranged to form a snap acting linkage whereby movement of said actuating member in one direction from a first position wherein said spring biases said indicator member to said first position to a second position wherein said spring biases said indicator member to said second position causes said indicator to move with a snap action between said positions, said spring means biasing said actuating member in one direction when said indicator member is in both said first and second positions.

6. An indicator for use in a changeover pressure regulator having first and second movable valve means therein, said indicator comprising a generally U-shaped frame having side walls, an end wall extending across said side walls at one and of said frame, a first pair of pivots on said frame side walls adjacent said end wall, a second pair of pivots on said frame side walls at the end away from said end wall, an indicator member pivotally mounted on said first pair of pivots for swinging movement between first and second positions, an actuating member pivotally mounted on said second pair of pivots, said indicator member having a portion extending between said frame side walls beyond said second pair of pivots, an opening in said indicator member adjacent said first pair of pivots, said actuating member having a projecting portion extending into said opening, said opening having a projecting tab on the side away from said first pair of pivots, a projecting tab on the projecting portion of said actuating member, a coil spring extending between said tabs to bias them away from each other, said first and second pairs of pivots and said first and second tabs being arranged to form a snap acting linkage whereby movement of said actuating member in one direction from a first position wherein said spring biases said indicator member to said first position to a second position wherein said spring biases said indicator member to said second position causes said indicator member to move with a snap action between said positions, said spring means biasing said actuating member in one direction when said indicator member is in both said first and second positions, said actuating member having projecting portions adapted to be engaged by said first and second valve means to shift said actuating member in the other direction whereby said indicator member is moved between said first and second positions in response to movement of one of said valve means.

References Cited by the Examiner

UNITED STATES PATENTS

| | | | |
|---|---|---|---|
| 2,626,628 | 1/53 | Norway | 137—113 |
| 2,630,821 | 3/53 | Arey | 137—113 |
| 2,741,257 | 4/56 | Edwards | 137—113 |
| 3,001,541 | 9/61 | St. Clair | 137—113 |
| 3,033,220 | 5/62 | St. Clair | 137—113 |

FOREIGN PATENTS

| | | |
|---|---|---|
| 811,915 | 4/59 | Great Britain. |
| 894,268 | 4/62 | Great Britain. |

ISADOR WEIL, *Primary Examiner.*

CLARENCE R. GORDON, *Examiner.*

UNITED STATES PATENT OFFICE
CERTIFICATE OF CORRECTION

Patent No. 3,207,169　　　　　　　　　　　　　　September 21, 1965

Paul J. Miller

It is hereby certified that error appears in the above numbered patent requiring correction and that the said Letters Patent should read as corrected below.

Column 7, line 3, for "means" read -- member --.

Signed and sealed this 29th day of March 1966.

(SEAL)
Attest:

ERNEST W. SWIDER
Attesting Officer

EDWARD J. BRENNER
Commissioner of Patents